UNITED STATES PATENT OFFICE.

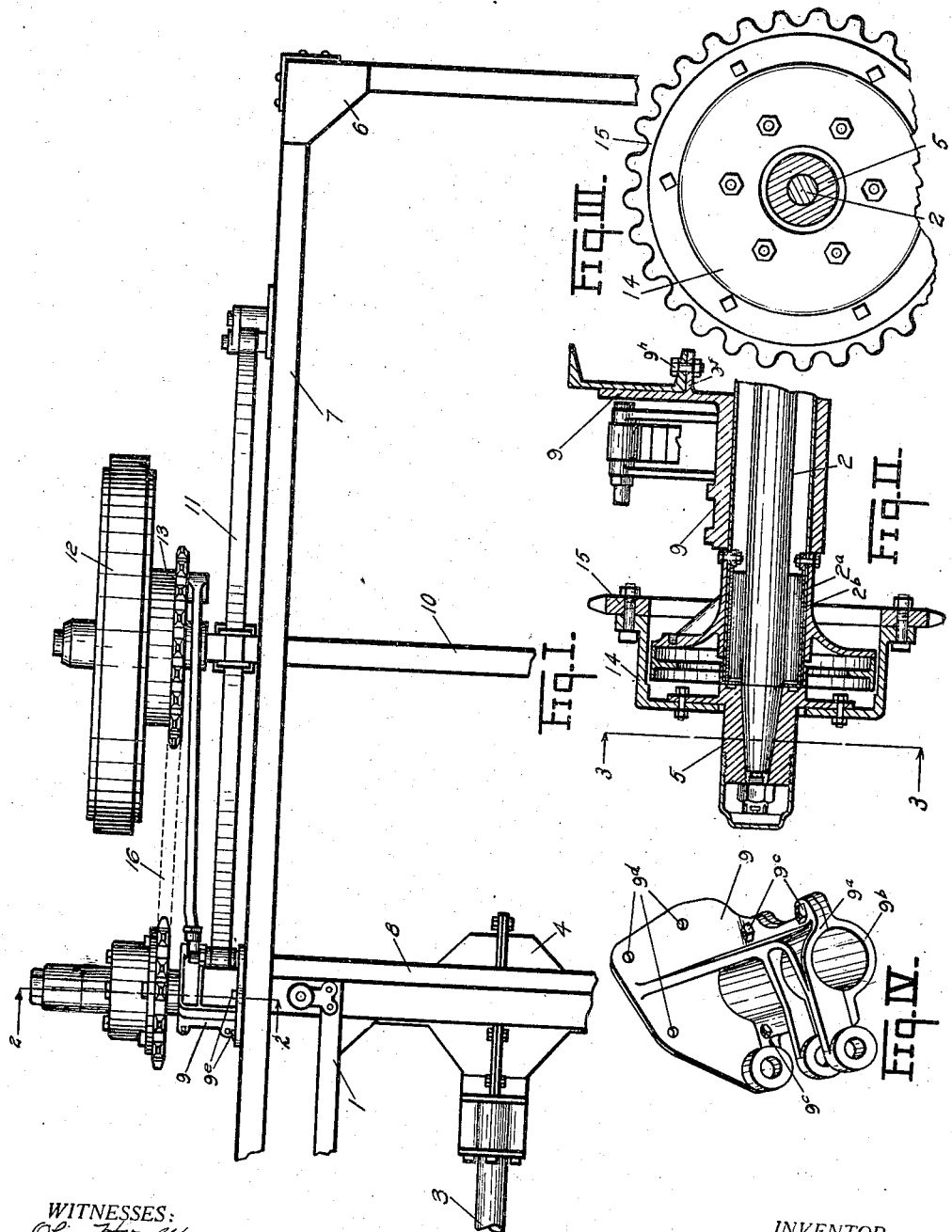

ERWIN GREER, OF CHICAGO, ILLINOIS, ASSIGNOR TO MAXFER TRUCK AND TRACTOR COMPANY, OF CHICAGO, ILLINOIS.

MEANS FOR CONVERTING AUTOMOBILES INTO TRUCKS.

1,244,727.  Specification of Letters Patent.  Patented Oct. 30, 1917.

Application filed January 23, 1917. Serial No. 143,914.

*To all whom it may concern:*

Be it known that I, ERWIN GREER, a citizen of the United States, residing at Chicago, Illinois, have invented certain new and useful Improvements in Means for Converting Automobiles into Trucks, of which the following is a specification.

This invention relates to means for converting automobiles of the pleasure type into motor trucks for freight carrying uses.

The present improvement has for its object to provide a simple and efficient structural formation and association of parts whereby the rear axle of a pleasure automobile is utilized, without change or refitting, as an intermediate drive or jack shaft having driving connection with the drive wheels of an extension frame by which the pleasure automobile is converted into a freight carrying vehicle, all as will hereinafter more fully appear.

Further objects, and objects relating to details and economies of construction and operation, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a plan view of a portion of the chassis, illustrating the general arrangement of parts in the present invention.

Fig. II is a vertical detail section on line 2—2 of Fig. I.

Fig. III is an end elevation of the bell sprocket showing the axle and hub in section on line 3—3 of Fig. II.

Fig. IV is a perspective view of a bracket for supporting the auxiliary or extension frame.

In the drawing, similar reference characters refer to similar parts throughout the several views, and the sectional views are taken looking in the direction of the little arrows at the ends of the section lines.

In referring to the drawing, I consider the reference characters representing the parts themselves.

Referring to the drawing, 1 designates the rear portion of one of the longitudinal rails of the chassis of an automobile, preferably of the "Ford" type, and 2 designates the usual driving axle associated with said chassis and receiving motion from the engine shaft 3, through equalizing gears contained within the casing 4, as usual. The axle 2 is rotatably mounted in the roller bearings 2ª, surrounded and reinforced by the sleeve 2ᵇ of the rear brake housing which is the usual Ford structure.

In the present improvement the respective outer ends of the two sections comprising the rear axle 2 aforesaid, will have their wheel portions removed, with the exception of the respective flanged hubs 5, which remain fixed to said axle sections for use in the manner hereinafter described.

6 designates a portion of an auxiliary or extension frame adapted for attachment to the automobile frame aforesaid, preferably of the rectangular form shown and having longitudinal rails 7 which, in the construction shown, are secured to the rails 1 aforesaid, by a transverse beam 8, disposed near the rear end of the rails 1, with the ends of the rails 7 extending forwardly some distance in front of the beam 8 so that a secondary attachment between the rails 1 and 7 can be made with a view to greater strength and stability of the connection between the parts.

9 designates individual brackets attached to the exterior of each longitudinal rail 7 and adapted to engage the casing of an axle section 2, to hold the same in fixed position with relation to the rail 7, and in order that the axle 2 will constitute an intermediate jack shaft for the present structure. The bracket 9 comprises an upper portion 9ª and a lower portion 9ᵇ provided with complementary recesses to receive the rear axle casing and secured together by means of bolts 9ᶜ. The upper portion 9ª is provided with bolt holes 9ᵈ to receive the bolts 9ᵉ by which it is attached to the frame member 7.

A flange 9ᶠ is secured to the lower flange of the side number 7 by bolts 9ʰ. See Fig. II.

10 designates an axle connected in any usual manner to the extension frame 6 aforesaid, and preferably by side springs 11, as illustrated in Fig. I.

12 designates one of the driving wheels of the present extension structure, mounted on an end of the axle 10 and provided with a sprocket drum 13.

14 designates a sprocket drum having its sprocket rim 15 arranged in alined relation with a corresponding sprocket rim of the sprocket drum 13 aforesaid, and adapted to be operatively connected therewith by means of the usual sprocket chain 16, shown in dotted lines in Fig. I. In the present improvement the sprocket drum 14 is of a bell or cup form, as shown, and has a radial web portion formed with a series of bolt orifices corresponding with the bolt orifices in the flange of a hub or sleeve aforesaid, so that the parts may be securely bolted together by bolts passing through the bolt orifices of the respective parts. The bell or cup shape of the sprocket drum 14 is a material part of the present invention, in that it provides a substantial and convenient connection of said sprocket drum 14 to the hub 5 of an axle section 2, and at the same time positions its sprocket rim 15 into proper alinement with the sprocket rim of the driving wheel 12 without any cutting or tooling of the axle section, and preserving the same in their original condition so that a change back to a pleasure vehicle can be conveniently and economically made. The bell-sprocket provision above described makes it possible to have the rear wheels track with the front wheels, without cutting the ends of the axle to accomplish such result.

It will be noted that the sprocket teeth of the rear rim sprocket lie in a plane that intersects the roller bearings. By this structure the pull on these sprocket teeth is applied intermediate the ends of the roller bearings and the pressure on the latter is, therefore, evenly distributed.

Having thus described my invention, what I claim as new and desire to secure by Letters Patent, is:

1. In a convertible automobile chassis, the combination of an automobile frame, a differential drive shaft associated therewith and provided with flanged hubs and roller bearings at its outer ends, an extension frame connected to said automobile frame, drive wheels associated with said extension frame and provided with sprocket rims, cup-shaped sprocket drums having at one end radial webs secured to the flanges of the aforesaid hubs and near the other end sprocket rims in alinement with the sprocket rims of the drive wheels aforesaid, and chain connections between said sprocket rims, said sprocket rims of said cup-shaped sprocket drums surrounding said bearings.

2. In a convertible automobile chassis, the combination of a rear axle section of an automobile, a roller bearing adjacent the outer end of said axle section, a flanged hub on the outer end of said axle section, and a cup-shaped sprocket drum having at one end a radial web secured to the flange of said hub and near the other end a sprocket rim adapted for chain connection with a sprocket rim of a drive wheel of an extension frame, the said sprocket rim of said cup-shaped sprocket drum lying in a plane intersecting said roller bearing.

3. The combination with an automobile chassis including the usual operative frame and having its rear wheels removed, of an auxiliary truck frame secured to the automobile frame and extending rearwardly thereof to form a single combined frame, truck wheels with driven sprocket wheels on their inner faces and axle for supporting said auxiliary frame, and means for driving said wheels by the power furnished by the automobile consisting of cup shaped sprockets disposed in the position of the said removed rear wheels, the driving teeth of each of which is disposed in the plane of the driven sprocket and in a plane intersecting its own bearing, the arrangement being such that the auxiliary frame is adapted for receiving a truck body.

In witness whereof, I have hereunto set my hand and seal.

ERWIN GREER. [L. S.]

Copies of this patent may be obtained for five cents each, by addressing the "Commissioner of Patents, Washington, D. C."